(12) United States Patent
Mutoh

(10) Patent No.: US 7,356,101 B2
(45) Date of Patent: Apr. 8, 2008

(54) APPARATUS AND A METHOD FOR CALCULATION OF A CORRELATION VALUE CORRESPONDING TO A FREQUENCY ERROR, AND A RECORDING MEDIUM WITH A RECORDED CORRELATION VALUE CALCULATION PROGRAM

(75) Inventor: Masahiko Mutoh, Saitama-ken (JP)

(73) Assignee: ADVANTEST Corporation, Tokyo (JP)

( * ) Notice: Subject to any disclaimer, the term of this patent is extended or adjusted under 35 U.S.C. 154(b) by 644 days.

(21) Appl. No.: 10/760,426

(22) Filed: Jan. 21, 2004

(65) Prior Publication Data
US 2004/0184608 A1 Sep. 23, 2004

Related U.S. Application Data

(62) Division of application No. 09/679,079, filed on Oct. 5, 2000, now Pat. No. 6,807,242.

(30) Foreign Application Priority Data
Oct. 7, 1999 (JP) ............... 1999-286356
Dec. 21, 1999 (JP) ............... 1999-009676

(51) Int. Cl.
*H04L 27/06* (2006.01)
(52) U.S. Cl. .................................... 375/343
(58) Field of Classification Search ............... 375/142, 375/143, 150, 152, 343; 324/76.33; 708/5, 708/422, 813
See application file for complete search history.

(56) References Cited
U.S. PATENT DOCUMENTS

| | | | |
|---|---|---|---|
| 5,177,767 A | 1/1993 | Kato | |
| 5,610,939 A * | 3/1997 | Takahashi et al. | 375/150 |
| 5,727,027 A | 3/1998 | Tsuda | |
| 5,774,494 A * | 6/1998 | Sawahashi et al. | 375/152 |
| 5,822,365 A | 10/1998 | Lee | |
| 6,441,780 B1 | 8/2002 | Rog et al. | |
| 6,496,552 B2 | 12/2002 | Tomofuji et al. | |
| 6,542,560 B1 | 4/2003 | Buehrer et al. | |
| 6,741,667 B1 * | 5/2004 | Suda | 375/354 |

FOREIGN PATENT DOCUMENTS

| | | |
|---|---|---|
| KR | 0162831 | 12/1998 |
| KR | 0186590 | 5/1999 |

OTHER PUBLICATIONS

M.K. Sust et al; "Rapid Acquisition Concept for Voice Activated CDMA Communication". European Space Research and Technology Centre, Noordwijk, The Netherlands; CH2827 4/90/0000-1820.

* cited by examiner

*Primary Examiner*—Sam K. Ahn
(74) *Attorney, Agent, or Firm*—Greenblum & Bernstein, P.L.C.

(57) ABSTRACT

An apparatus for calculation of correlation that can take a correlation even when a frequency error is relatively large. With a 0-th degree correlator for taking, to output, a correlation between a reference signal and a measurement signal, an n-th degree correlator including an $e^{jwt}$ multiplier for calculating a frequency component addition signal having a frequency component added to the reference signal, and a correlation calculator for taking, to output, a correlation between the frequency component addition signal and the measurement signal, and an adder for adding an output of the 0-th degree correlator and an output of the n-th degree correlator, it is achieved that the output of the 0-th degree correlator and the output of the n-th degree correlator added at the adder do not have an increased noise/correlation value ratio, even when a frequency error is large. Accordingly, a correlation can be taken even with an increased frequency error.

7 Claims, 14 Drawing Sheets

A : Reference signal R0(t)
B : 4kHz-added reference signal Rn(t)
C : Result of addition of correlation value
D : Noise A : Reference signal R(t)
D : Noise

APPARATUS AND A METHOD FOR CALCULATION OF A CORRELATION VALUE CORRESPONDING TO A FREQUENCY ERROR, AND A RECORDING MEDIUM WITH A RECORDED CORRELATION VALUE CALCULATION PROGRAM This application is a Divisional Application Under Rule 53 (b) of application Ser. No. 09/679,079 filed on Oct. 5, 2000, now U.S. Pat. No. 6,807,242, which in turn is a Continuation of Japanese Patent Application No. 286356/1999 filed on Oct. 7, 1999, and Japanese Utility Model Application No. 009676/1999 filed on Dec. 21, 1999, and priority is hereby claimed under 35 USC 120 based on these applications.

BACKGROUND OF INVENTION

1. Field of the Invention

The present invention relates to an apparatus for calculation of a correlation value concerning a spreading technique to be used such as for radio communications. In particular, it relates to a correlation value calculation apparatus that can take a correlation even when a frequency error range is relatively large.

2. Description of the Related Art

For example, in the form of a CDMA (Code Division Multiple Access) system, a radio communication is performed by a method in which a coded audio data with a bandwidth of 10 kHz for example is spectrum spread to a bandwidth of 1.25 MHz, to have the same band shared by a plurality of communication channels. At a reception end, a correlation is taken with a received spread code, and a reverse spreading process is performed for demodulation and extraction to reproduce a transmitted original data. There is a form of W-CDMA (Wideband-Code Division Multiple Access) system.

As the frequency of a radio signal to be received, there is used a band of several GHz. Therefore, unless the frequency conversion is made with a frequency accuracy of 1 ppm for example, it becomes difficult, as a problem, to take a correlation with a spread code within a received signal to reproduce a data, as a frequency error develops.

Next, there will be shown below how to determine a correlation value Corr(T). A measurement signal S(t) can be obtained by superposing a spread code L(t) on a transmitted data D(t).

The correlation value Corr(T) can be determined by the following Expression 1.

$$Corr(T) = \left| \sum_t S(t) \times R^*(t) \right|^2 \quad \text{Expression 1}$$

In this Expression 1, S(t) is a measurement signal (spread wave), R(t) is a reference signal, R*(t) is a complex conjugate of R(t), t is a correlation range, and T is a retrieval range.

In the Expression 1, the retrieval range (T) is calculated, and a highest correlation value is given at a position where a correlation is obtained. In this system, however, for a measurement signal with a frequency error, there occurs a case in which the correlation cannot be taken. As an example, there is shown in FIG. 13 a characteristic of "frequency error" vs. "correlation value" at a correlation peak point under the following conditions. The conditions of FIG. 13 are as in a characteristic graph for a data rate of 16 ksps (BPSK), a spread rate by using an orthogonal gold code of 4.096 Mcps (QPSK), a spread ratio of 256, and a correlation range of 6 symbol data. However, the absolute value of the correlation value is changed by the measurement signal.

Next, there is shown in FIG. 14 a "frequency error" vs. "noise/correlation value ratio", where the "noise/correlation value ratio" is a ratio of a noise by correlation error to a correlation value at a correlation peak value.

As in the graph of FIG. 14, it can be seen that, as the noise is increased with an increase in correlation error, a practical frequency error clearly discriminative of a correlation value resides within approximate 2 kHz or near. In other words, for the data rate of 16 ksps and the correlation range of 6 symbol data, it is to be allowed merely up to a frequency error of approximate 2 kHz or near to determine a point matching with a known data by taking a correlation. On the other hand, in the radio communication which uses a high frequency range of a band of several GHz, it is allowed for a correlation to be taken merely within a frequency error of 1 ppm or near, as a difficulty. There is thus needed an improved analog performance.

SUMMARY OF INVENTION

In the conventional art, like the ratio communication of a CDMA system, in a radio communication which uses a high frequency range of a band of several GHz, there is a condition with a tendency to generate a frequency error of 1 ppm or near, as described. As the frequency error gets greater, it is disabled to take a correlation accompanying therewith, with a difficulty to properly reproduce data, as a drawback. On the contrary, for reduction of frequency error, it is needed at a transmission end as well as at a reception end to use a highly stable frequency converter for an analog performance to be improved, with a resultant high cost of the apparatus, as a drawback.

It therefore is an object of the present invention to provide an apparatus for correlation that can take a correlation even when the frequency error range is relatively large.

According to a non-limiting feature of the invention, provided is an apparatus for calculation of a correlation value corresponding to a frequency error, includes: a 0-th degree correlation unit for taking, to output, a correlation between a reference signal and a measurement signal; an n-th degree correlation unit including a frequency addition calculator for calculating a frequency component addition signal having a frequency component added to the reference signal, and a correlation calculator for taking, to output, a correlation between the frequency component addition signal and the measurement signal; and an addition unit for adding an output of the 0-th degree correlation unit and an output of the n-th degree correlation unit.

In an apparatus for calculation of a correlation value corresponding to a frequency error constituted as above, the output of the 0-th degree correlation unit and the output of the n-th degree correlation unit added at the addition unit do not suddenly get reduced even in the case the frequency error is large, and do not have an increased noise/correlation value ratio. Accordingly, a correlation can be taken even with an increased frequency error.

A non-limiting feature of the present invention includes an apparatus for calculation of a correlation value corresponding to a frequency error, wherein the frequency addition calculator multiplies the reference signal by $e^{jwt}$, where $\omega=2\pi f$ (f is a frequency).

A non-limiting feature of the present invention includes an apparatus for calculation of a correlation value corresponding to a frequency error, wherein the frequency addition calculator takes an EXOR between a digital clock of a constant frequency and the reference signal.

The term EXOR is an abbreviation of "exclusive or" and means 'exclusive logical sum'.

A non-limiting feature of the present invention includes an apparatus for calculation of a correlation value corresponding to a frequency error, wherein the reference signal is a data symbol having a spread code superposed thereon, and the frequency addition calculator takes an EXOR between the data symbol and a digital clock of a constant frequency, to superpose the spread code.

A non-limiting feature of the present invention includes a method for calculation of a correlation value corresponding to a frequency error, including: a 0-th degree correlation step for taking, to output, a correlation between a reference signal and a measurement signal; an n-th degree correlation step including a frequency addition calculator for calculating a frequency component addition signal having a frequency component added to the reference signal, and a correlation calculator for taking, to output, a correlation between the frequency component addition signal and the measurement signal; and an addition step for adding an output of the 0-th degree correlation step and an output of the n-th degree correlation step.

A non-limiting feature of the present invention includes a computer-readable medium embodying a program of instructions for execution by the computer to perform a method for calculation of a correlation value corresponding to a frequency error, including: a 0-th degree correlation step for taking, to output, a correlation between a reference signal and a measurement signal; an n-th degree correlation step including a frequency addition calculator for calculating a frequency component addition signal having a frequency component added to the reference signal, and a correlation calculator for taking, to output, a correlation between the frequency component addition signal and the measurement signal; and an addition step for adding an output of the 0-th degree correlation step and an output of the n-th degree correlation step.

A non-limiting feature of the present invention includes a correlation system including: a frequency adding unit for receiving a reference signal R0(t) and adding thereto a predetermined plurality n of frequency components (F1-Fn) to output a resultant reference signal R1(t)-Rn(t); an adder for receiving n reference signals R1(t)-Rn(t) and a single said reference signal R0(t) as a base and adding them together to output a corrected reference signal R(t); and a correlator for taking a correlation between a measurement signal S(t) and said corrected reference signal R(t) to output a correlation output signal.

A non-limiting feature of the present invention includes a correlation system, wherein the frequency adding unit multiplies the reference signal R0(t) by $e^{-j\omega t}$, where $\omega=2\pi f$ (f is a frequency).

A non-limiting feature of the present invention includes a correlation system, wherein the frequency adding unit outputs an exclusive logical sum (EXOR) between digital clocks of frequencies corresponding to the frequency components (F1-Fn) and the reference signal R0(t).

A non-limiting feature of the present invention includes a correlation system including a frequency adding unit having a predetermined plurality n of multiplying unit (EXOR), an adder, a spreader, and a correlator, wherein the plurality n of multiplying unit (EXOR) each receive a corresponding frequency component (F1-Fn) and a symbol data D0(t) as a base and multiply both of them to output a multiplied symbol data D1(t)-Dn(t), the adder receives said symbol data D1(t)-Dn(t) from a respective multiplying unit (EXOR) and said symbol data D0(t) as the base and performs an adding process for them to output a resultant addition symbol data D(t), the spreader receives a spread signal of said addition symbol data D(t) and superposes thereon a spread code L(t) to output a corrected reference signal R(t), and the correlator receives said corrected reference signal R(t) and a measurement signal S(t) and takes a correlation between them to output a correlation output signal.

A non-limiting feature of the present invention includes a correlation system, wherein the measurement signal S(t) is a reception signal of a spread signal spectrum spread.

A non-limiting feature of the present invention includes a correlation system, wherein the measurement signal S(t) is a reception signal of a spread signal spectrum spread.

A non-limiting feature of the present invention includes a correlation system, wherein the measurement signal S(t) is a spectrum spread signal of a W-CDMA system.

A non-limiting feature of the present invention includes a correlation system, wherein the measurement signal S(t) is a spectrum spread signal of a W-CDMA system.

A non-limiting feature of the present invention includes a correlation method including: a frequency adding step for receiving a reference signal R0(t) and adding thereto a predetermined plurality n of frequency components (F1-Fn) to output a resultant reference signal R1(t)-Rn(t); an adding step for receiving n reference signals R1(t)-Rn(t) and a single said reference signal R0(t) as a base and adding them together to output a corrected reference signal R(t); and a correlating step for taking a correlation between a measurement signal S(t) and said corrected reference signal R(t) to output a correlation output signal.

A non-limiting feature of the present invention includes a correlation method including a frequency adding step having a predetermined plurality n of multiplying step (EXOR), an adding step, a spreading step, and a correlating step, wherein the plurality n of multiplying step (EXOR) each receive a corresponding frequency component (F1-Fn) and a symbol data D0(t) as a base and multiply both of them to output a multiplied symbol data D1(t)-Dn(t), the adding step receives said symbol data D1(t)-Dn(t) from a respective multiplying step (EXOR) and said symbol data D0(t) as the base and performs an adding process for them to output a resultant addition symbol data D(t), the spreading step receives a spread signal of said addition symbol data D(t) and superposes thereon a spread code L(t) to output a corrected reference signal R(t), and the correlating step receives said corrected reference signal R(t) and a measurement signal S(t) and takes a correlation between them to output a correlation output signal.

A non-limiting feature of the present invention includes a computer-readable medium embodying a program of instructions for execution by the computer to perform a correlation method including: a frequency adding step for receiving a reference signal R0(t) and adding thereto a predetermined plurality n of frequency components (F1-Fn) to output a resultant reference signal R1(t)-Rn(t); an adding step for receiving n reference signals R1(t)-Rn(t) and a single said reference signal R0(t) as a base and adding them together to output a corrected reference signal R(t); and a correlating step for taking a correlation between a measurement signal S(t) and said corrected reference signal R(t) to output a correlation output signal.

A non-limiting feature of the present invention includes a computer-readable medium embodying a program of instructions for execution by the computer to perform a correlation method including a frequency adding step having a predetermined plurality n of multiplying step (EXOR), an adding step, a spreading step, and a correlating step, wherein the plurality n of multiplying step (EXOR) each receive a corresponding frequency component (F1-Fn) and a symbol data D0(t) as a base and multiply both of them to output a multiplied symbol data D1(t)-Dn(t), the adding step receives said symbol data D1(t)-Dn(t) from a respective multiplying step (EXOR) and said symbol data D0(t) as the base and performs an adding process for them to output a resultant addition symbol data D(t), the spreading step receives a spread signal of said addition symbol data D(t) and superposes thereon a spread code L(t) to output a corrected reference signal R(t), and the correlating step receives said corrected reference signal R(t) and a measurement signal S(t) and takes a correlation between them to output a correlation output signal.

A non-limiting feature of the present invention includes an apparatus for calculation of a correlation value corresponding to a frequency error, including: a 0-th degree correlation device that takes, to output, a correlation between a reference signal and a measurement signal; an n-th degree correlation device that includes a frequency addition calculator for calculating a frequency component addition signal having a frequency component added to the reference signal, and a correlation calculator for taking, to output, a correlation between the frequency component addition signal and the measurement signal; and an addition device that adds an output of the 0-th degree correlation device and an output of the n-th degree correlation device.

A non-limiting feature of the present invention includes a correlation system including: a frequency adding device that receives a reference signal R0(t) and adds thereto a predetermined plurality n of frequency components (F1-Fn) to output a resultant reference signal R1(t)-Rn(t); an adder that receives n reference signals R1(t)-Rn(t) and a single said reference signal R0(t) as a base and adds them together to output a corrected reference signal R(t); and a correlator that takes a correlation between a measurement signal S(t) and said corrected reference signal R(t) to output a correlation output signal.

A non-limiting feature of the present invention includes a correlation system including a frequency adding device having a predetermined plurality n of multiplying device (EXOR), an adder, a spreader, and a correlator, wherein the plurality n of multiplying device (EXOR) each receive a corresponding frequency component (F1-Fn) and a symbol data D0(t) as a base and multiply both of them to output a multiplied symbol data D1(t)-Dn(t), the adder receives said symbol data D1(t)-Dn(t) from a respective multiplying device (EXOR) and said symbol data D0(t) as the base and performs an adding process for them to output a resultant addition symbol data D(t), the spreader receives a spread signal of said addition symbol data D(t) and superposes thereon a spread code L(t) to output a corrected reference signal R(t), and the correlator receives said corrected reference signal R(t) and a measurement signal S(t) and takes a correlation between them to output a correlation output signal.

DESCRIPTION OF THE PREFFERED EMBODIMENTS

There will be described embodiments of the present invention with reference to the drawings.

First embodiment

Figure 1:
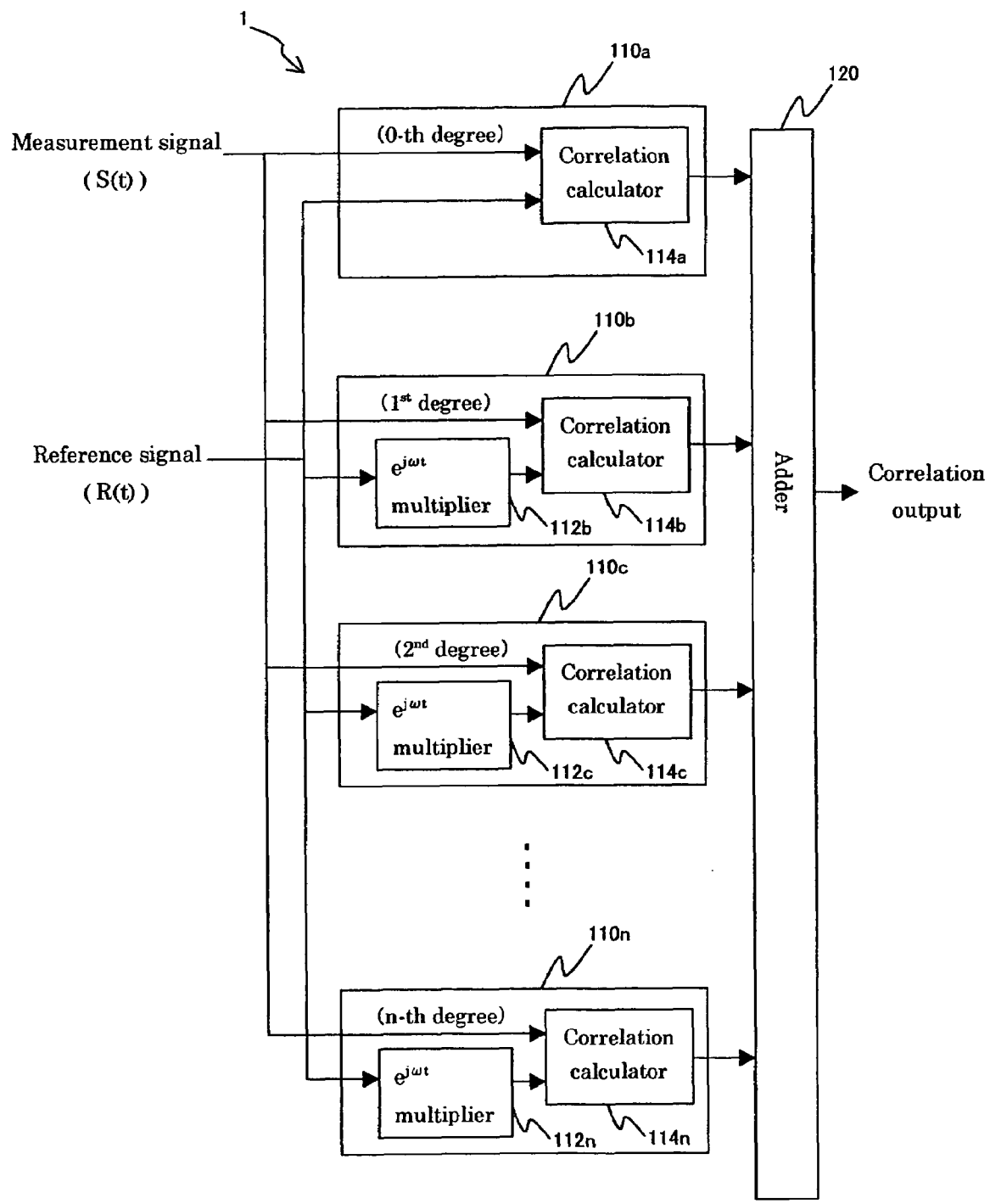
FIG. 1 is a block diagram showing a correlation value calculation apparatus 1 according to a first embodiment of the present invention.

First, constitution of a first embodiment will be described with reference to FIG. 1. A correlation value calculation apparatus 1 has a 0-th degree correlator 110a, an n-th degree correlator 110b-n, and an adder 120.

The 0-th degree correlator 110a includes a correlation calculator 114a. The correlation calculator 114a takes a correlation between a measurement signal S(t) and a reference signal R(t). An expression to show how to take the correlation is given below as an Expression 1.

$$Corr(T) = \left| \sum_t S(t) \times R^*(t) \right|^2 \quad \text{Expression 1}$$

The n-th degree correlator 110b-n includes an $e^{j\omega t}$ multiplier 112b-n and a correlation calculator 114b-n. The $e^{j\omega t}$ multiplier 112b-n corresponds to a frequency addition calculator. That is, the $e^{j\omega t}$ multiplier 112b-n calculates a frequency component addition signal having a frequency component added to the reference signal R(t). Note that the $e^{j\omega t}$ multiplier 112b multiplies the reference signal R(t) by $e^{j\omega 1 t}$, the $e^{j\omega t}$ multiplier 112c multiplies the reference signal R(t) by $e^{j\omega 2 t}$, and the $e^{j\omega t}$ multiplier 112n multiplies the reference signal R(t) by $e^{j\omega nt}$, where $\omega 1=2\pi F1$, $\omega 2=2\pi F2$, ..., and $\omega n=2\pi Fn$. It should be noted that if n=3, then the $e^{j\omega t}$ multiplier is merely any of 112b, c and n, and if n=5, then the $e^{j\omega t}$ multiplier is simply any of 112b, c, d, e and n.

Next, there will be described actions of the first embodiment. The 0-th degree correlator 110a (correlation calculator 114a) outputs a correlation value between the measurement signal S(t) and the reference signal R(t).

In the n-th degree correlator 110b, the $e^{j\omega t}$ multiplier 112b multiplies the reference signal R(t) by $e^{j\omega 1t}$. That is, a frequency component F1 is added to provide the output. Then, the correlation calculator 114b takes, to output, a correlation between the R(t) with the frequency component F1 added and the measurement signal S(t).

In the n-th degree correlator 110c, the $e^{j\omega t}$ multiplier 112c multiplies the reference signal R(t) by $e^{j\omega 2t}$. That is, a frequency component F2 is added to provide the output. Then, the correlation calculator 114c takes, to output, a correlation between the R(t) with the frequency component F2 added and the measurement signal S(t).

In the n-th degree correlator 110n, the $e^{j\omega t}$ multiplier 112n multiplies the reference signal R(t) by $e^{j\omega nt}$. That is, a frequency component Fn is added to provide the output. Then, the correlation calculator 114n takes, to output, a correlation between the R(t) with the frequency component Fn added and the measurement signal S(t).

Figure 2:
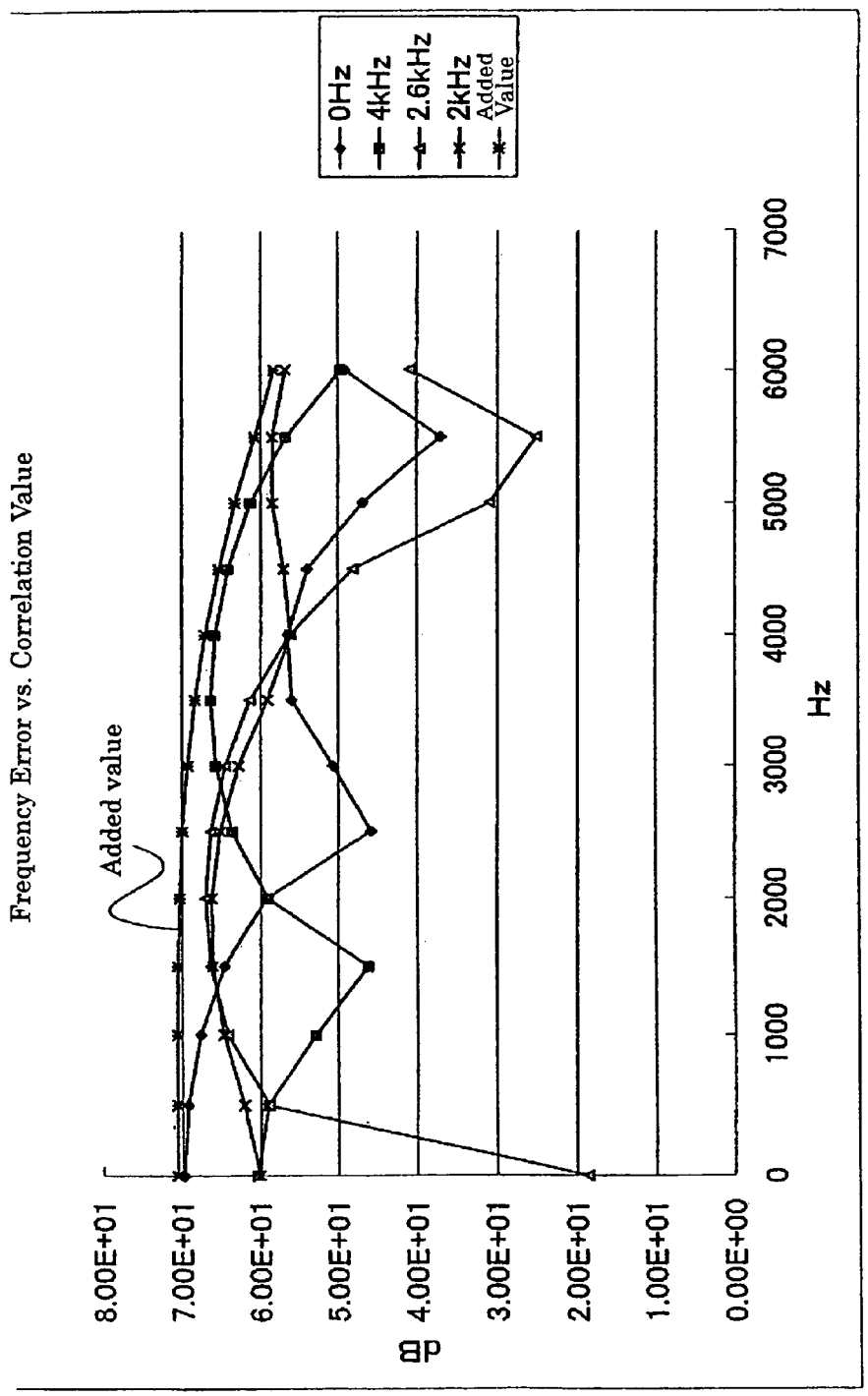
FIG. 2 is a diagram showing correlation values and a total sum thereof.

At the adder 120, there is output a total of a correlation value S0 between the reference signal R(t) and the measurement signal S(t), a correlation value S1 between the reference signal R(t) having the frequency component F1 added thereto and the measurement signal S(t), ..., and a correlation value Sn between the reference signal R(t) having the frequency component Fn added thereto and the measurement signal S(t). FIG. 2 shows the reference values and a total sum thereof In FIG. 2, n=3, F1=4 kHz, F2=2.6 kHz, and F3=2 kHz.

As shown in FIG. 2, S0 has a maximum at a frequency error 0, S1 has a maximum at a frequency error F1, S2 has a maximum at a frequency error F2, and S3 has a maximum at a frequency error F3. An addition value as a total of them will not suddenly decrease even when the frequency error is large. Accordingly, even with an increased frequency error, there can be taken a correlation without being buried in noises.

Second Embodiment

The second embodiment is different from the first embodiment in that a correspondent to the frequency addition calculator is an EXOR gate for taking an exclusive logical sum (EXOR) between a digital clock and a measurement signal S(t).

Figure 3:
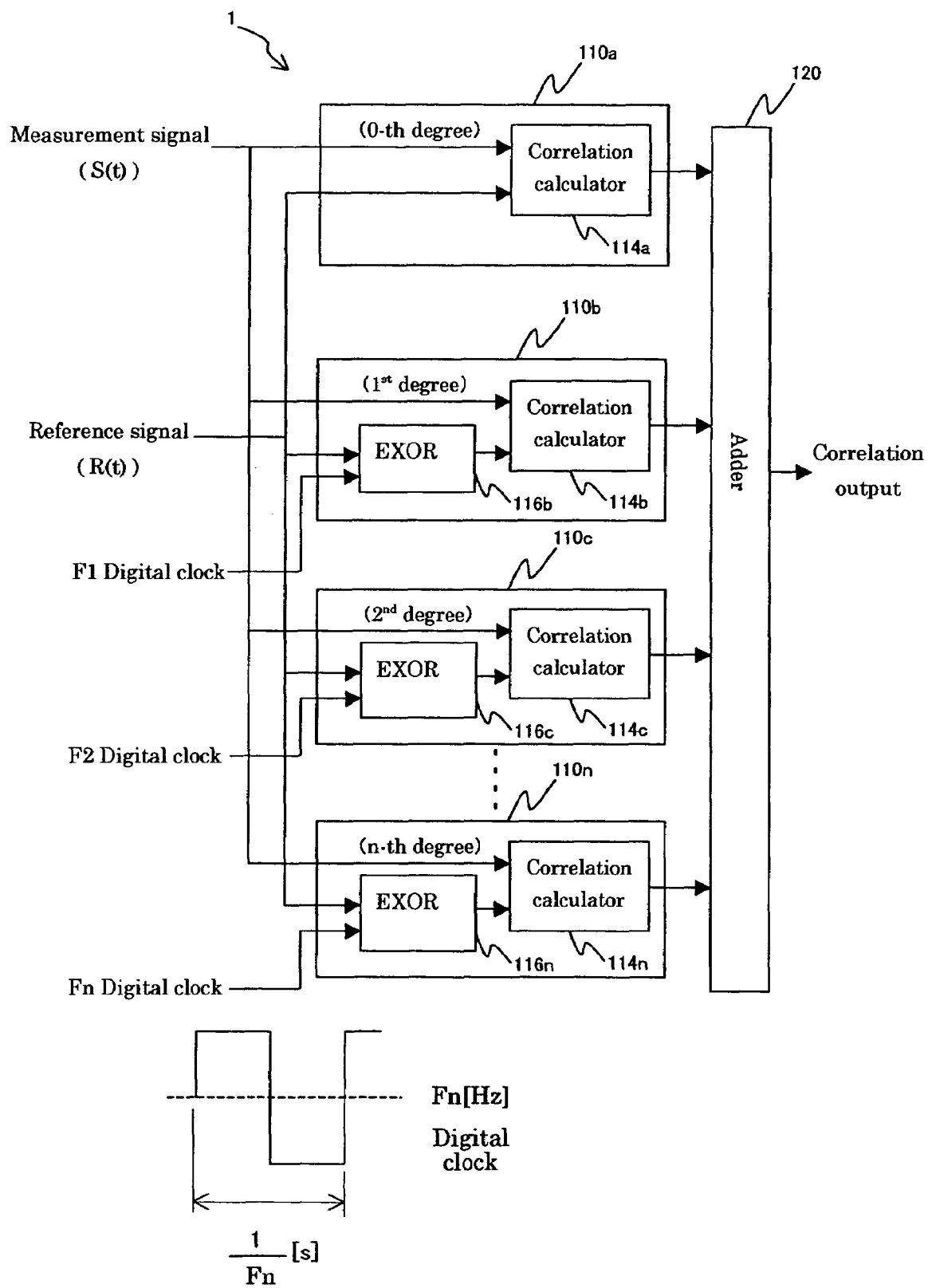
FIG. 3 is a block diagram showing a correlation value calculation apparatus 1 according to a second embodiment of the present invention.

FIG. 3 shows the constitution of a correlation value calculation apparatus 1 according to the second embodiment. An EXOR gate 116b-n corresponds to the frequency addition calculator. That is, the EXOR gate 116b-n calculates a frequency component addition signal having a frequency component added to a reference signal R(t). Note that the EXOR gate 116b takes an exclusive logical sum between the reference signal R(t) and a digital clock of a frequency F1, the EXOR gate 116c takes an exclusive logical sum between the reference signal R(t) and a digital clock of a frequency F2, and the EXOR gate 116n takes an exclusive logical sum between the reference signal R(t) and a digital clock of a frequency Fn. It should be noted that if n=3, then the EXOR gate is merely any of 116b, c and n, and if n=5, then the EXOR gate is simply any of 116b, c, d, e and n.

Next, there will be described actions of the correlation value calculation apparatus 1 according to the second embodiment. A 0-th degree correlator 110a (correlation calculator 114a) outputs a correlation value between the measurement signal S(t) and the reference signal R(t).

In an n-th degree correlator 110b, the EXOR gate 116b calculates the exclusive logical sum between the reference signal R(t) and the F1 digital clock. That is, a frequency component F1 is added to provide the output. Then, a correlation calculator 114b takes, to output, a correlation between the R(t) with the frequency component F1 added and the measurement signal S(t).

In an n-th degree correlator 110c, the EXOR gate 116c calculates the exclusive logical sum between the reference signal R(t) and the F2 digital clock. Then, a correlation calculator 114c takes, to output, a correlation between the R(t) with the frequency component F2 added and the measurement signal S(t).

In an n-th degree correlator 110n, the EXOR gate 116n calculates the exclusive logical sum between the reference signal R(t) and the Fn digital clock. That is, a frequency component Fn is added to provide the output. Then, a correlation calculator 114n takes, to output, a correlation between the R(t) with the frequency component Fn added and the measurement signal S(t).

At an adder 120, there is output a total of a correlation value S0 between the reference signal R(t) and the measurement signal S(t), a correlation value S1 between the reference signal R(t) having the frequency component F1 added thereto and the measurement signal S(t), ..., and a correlation value Sn between the reference signal R(t) having the frequency component Fn added thereto and the measurement signal S(t). A total of them will not suddenly decrease even when a frequency error is large. Accordingly, even with an increased frequency error, there can be taken a correlation without being buried in noises, like the first embodiment.

Third Embodiment

The third embodiment is different from the first and second embodiments in that a correspondent to the frequency addition calculator comprises an EXOR gate for taking an exclusive logical sum (EXOR) between a digital clock and a measurement signal S(t), and a spreader for spreading an output thereof.

Figure 4:
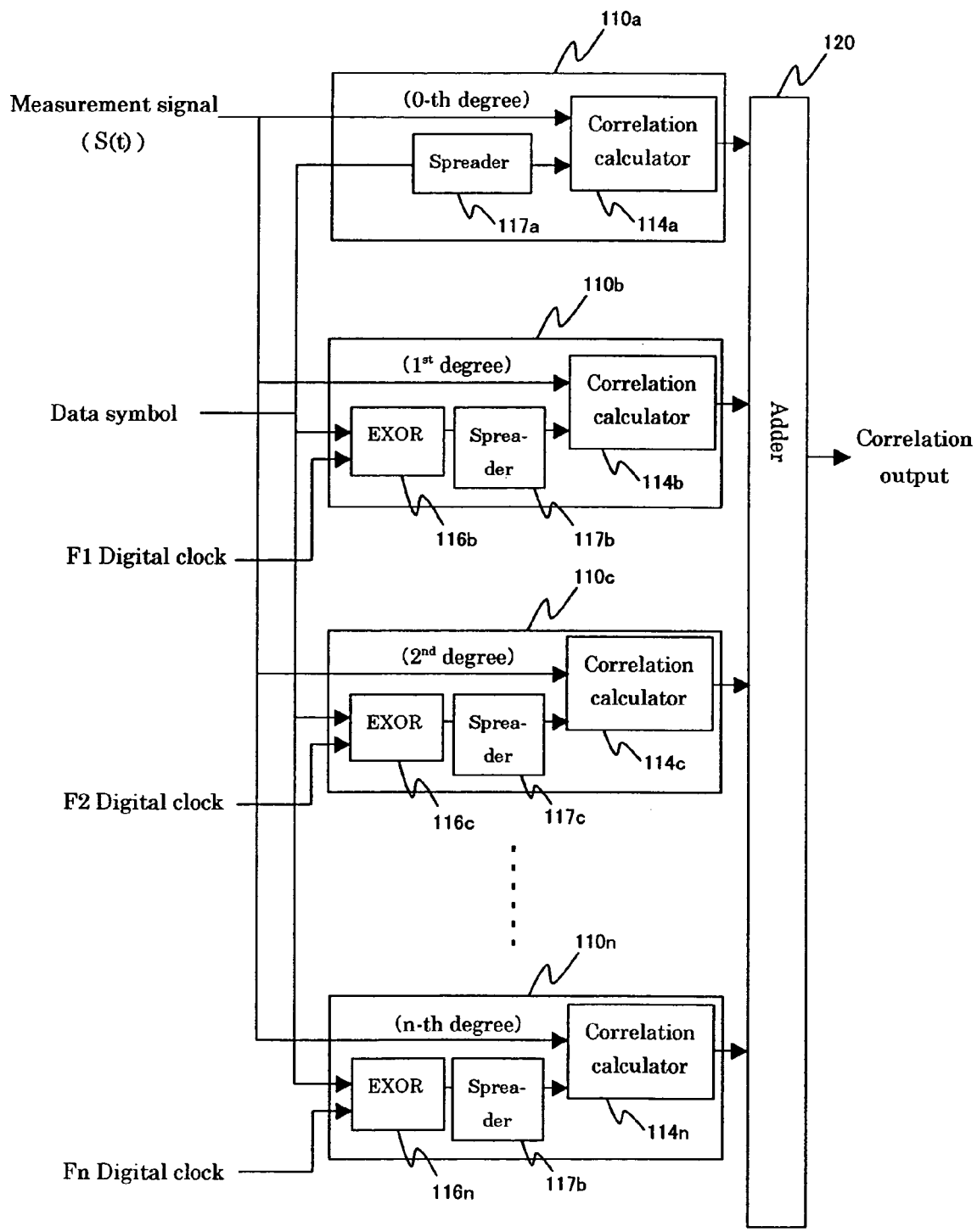
FIG. 4 is a block diagram showing a correlation value calculation apparatus 1 according to a third embodiment of the present invention.

FIG. 4 shows the constitution of a correlation value calculation apparatus 1 according to the third embodiment. The correlation value calculation apparatus 1 has a 0-th degree correlator 110a, an n-th degree correlator 110b-n, and an adder 120.

The 0-th degree correlator 110a has a correlation calculator 114a and a spreader 117a. The correlation calculator 114a takes a correlation between the measurement signal S(t) and a reference signal R(t). The expression to show how to take the correlation is like the first embodiment. The spreader 117a superposes a spread code on a data symbol to provide the reference signal R(t).

The n-th degree correlator 110b-n has an EXOR gate 116b-n and a spreader 117b-n. The EXOR gate 116b-n and the spreader 117b-n correspond to the frequency addition calculator. That is, the EXOR gate 116b-n and the spreader 117b-n calculate a frequency component addition signal having a frequency component added to the reference signal R(t). The EXOR gate 116*b-n* outputs, to the spreader 117*b-n*, an exclusive logical sum between a data symbol of the reference signal R(t) and a digital clock of a frequency F1-Fn. The spreader 117*b-n* superposes a spread signal on the exclusive logical sum input thereto, to calculate the frequency component addition signal having the frequency component F1-Fn added to the reference signal R(t).

Next, there will be described actions of the correlation value calculation apparatus 1 according to the third embodiment. The 0-th degree correlator 110*a* outputs a correlation value between the measurement signal S(t) and the reference signal R(t). That is, the spreader 117*a* superposes the spread code on the data symbol, to output as the reference signal R(t) to the correlation calculator 114*a*, and the correlation calculator 114*a* outputs the correlation value between the measurement signal S(t) and the reference signal R(t).

The n-th degree correlator 110*b* calculates a correlation between the frequency component addition signal having a frequency component F1 added to the reference signal R(t) and the measurement signal S(t). That is, the EXOR gate 116*b* outputs, to the spreader 117*b*, an exclusive logical sum between a data symbol of the reference signal R(t) and a digital clock of the frequency F1. The spreader 117*b* superposes a spread signal on the exclusive logical sum input thereto, to calculate a frequency component addition signal having the frequency component F1 added to the reference signal R(t). Then, at the correlation calculator 114*b*, there is calculated the correlation between the frequency component addition signal having the frequency component F1 added to the reference signal R(t) and the measurement signal S(t).

The n-th degree correlator 110*c* calculates a correlation between the frequency component addition signal having a frequency component F2 added to the reference signal R(t) and the measurement signal S(t). That is, the EXOR gate 116*c* outputs, to the spreader 117*c*, an exclusive logical sum between a data symbol of the reference signal R(t) and a digital clock of the frequency F2. The spreader 117*c* superposes a spread signal on the exclusive logical sum input thereto, to calculate a frequency component addition signal having the frequency component F2 added to the reference signal R(t). Then, at the correlation calculator 114*c*, there is calculated the correlation between the frequency component addition signal having the frequency component F2 added to the reference signal R(t) and the measurement signal S(t).

The n-th degree correlator 110*n* calculates a correlation between the frequency component addition signal having a frequency component Fn added to the reference signal R(t) and the measurement signal S(t). That is, the EXOR gate 116*n* outputs, to the spreader 117*n*, an exclusive logical sum between a data symbol of the reference signal R(t) and a digital clock of the frequency Fn. The spreader 117*n* superposes a spread signal on the exclusive logical sum input thereto, to calculate a frequency component addition signal having the frequency component Fn added to the reference signal R(t). Then, at the correlation calculator 114*n*, there is calculated the correlation between the frequency component addition signal having the frequency component Fn added to the reference signal R(t) and the measurement signal S(t).

Figure 5:
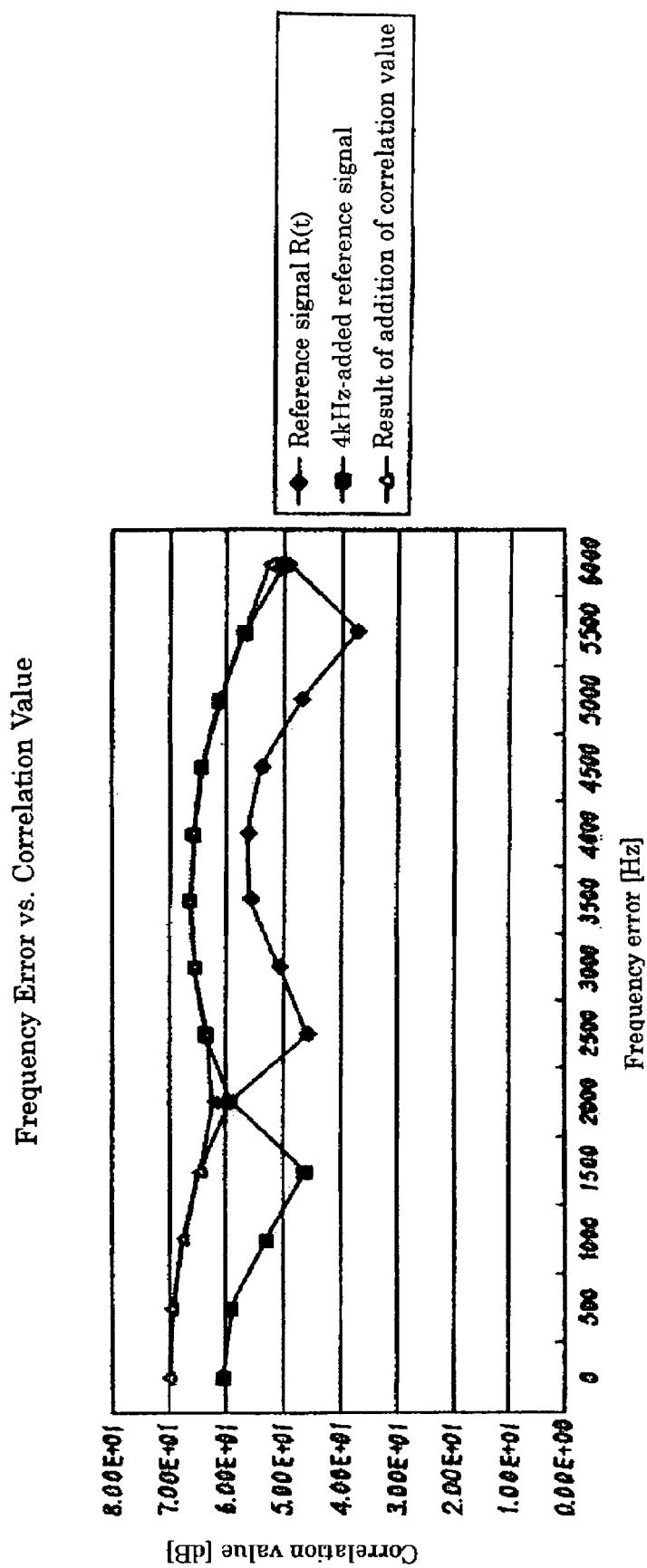
FIG. 5 is a diagram showing correlation values and a total sum thereof.

At the adder 120, there is output a total of a correlation value S0 between the reference signal R(t) and the measurement signal S(t), a correlation value S1 between the reference signal R(t) having the frequency component F1 added thereto and the measurement signal S(t), . . . , and a correlation value Sn between the reference signal R(t) having the frequency component Fn added thereto and the measurement signal S(t). FIG. 5 shows the reference values and a total sum thereof. In FIG. 5, n=1, and F1=4 kHz.

Further, the data rate is 16 kpbs (BPSK), the spread rate is by use of a 4.096 Mcps (QPSK) orthogonal gold code, the spread ratio is 256, the correlation range is for a 6 data symbol, and the multiplicity is by a 4 data multiplication.

Figure 6:
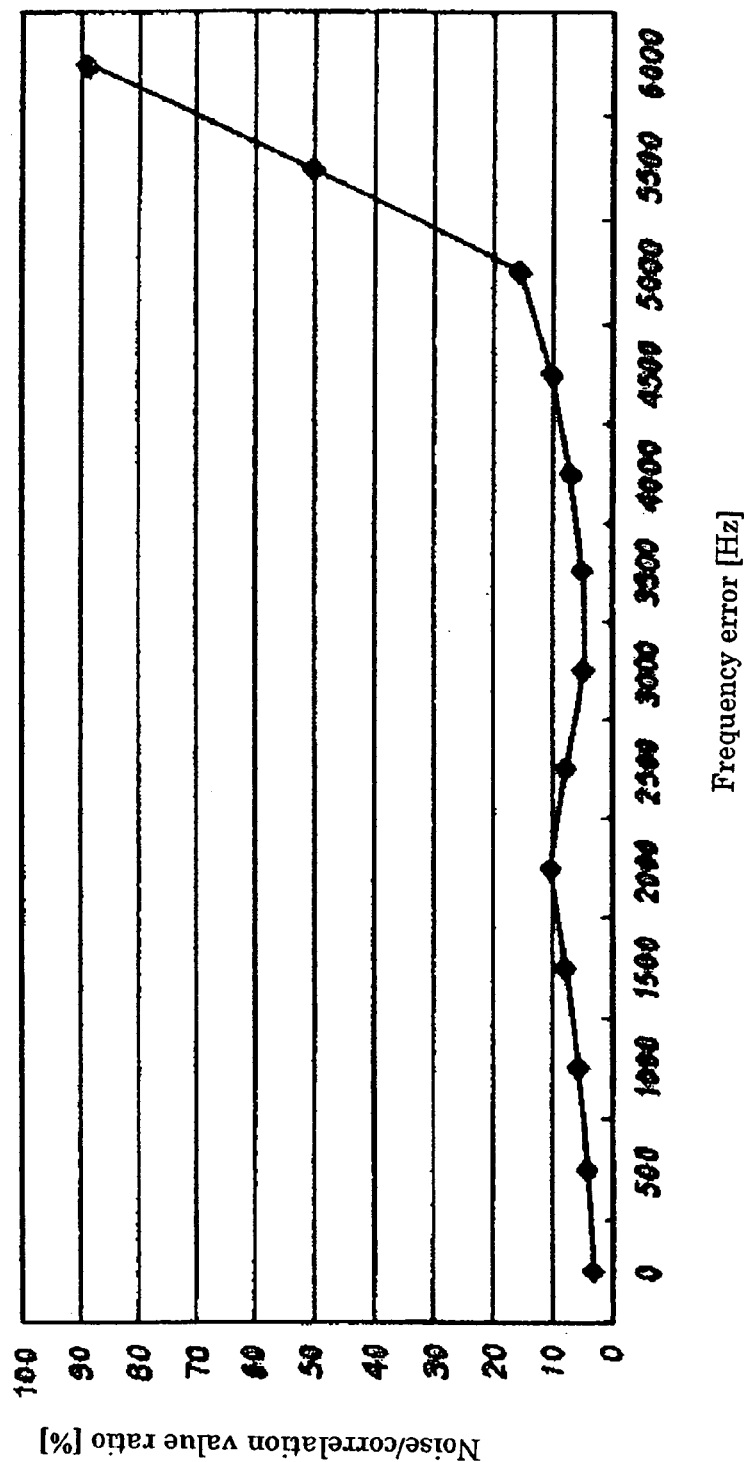
FIG. 6 is a diagram showing frequencies and noise/correlation value ratios corresponding thereto.

As shown in FIG. 5, S0 has a maximum at a frequency error 0, and S1 has a maximum at a frequency error F1. A total of them shows, as in FIG. 5, that the correlation value will not suddenly decrease even when the frequency error is large. FIG. 6 shows a noise/correlation value ratio of data shown in FIG. 5. The noise/correlation value ratio is small within a frequency error range up to 5000 Hz or near. That is, even with an increased frequency error, there can be taken a correlation without being buried in noises, like the first embodiment.

Fourth Embodiment

The present application implements a correlation value calculation apparatus in which the correlation value becomes maximum when matching with a known data even if a frequency deviation by a frequency error is developed. That is, there can be obtained a correlation by addition of a correlation value derived from a reference signal R0(t) made by a known symbol data D0(t), and a reference signal (Rn(t)) with an added frequency component. As a result, even with a relatively large frequency error, it is allowed to restore a data by taking a correlation. The principle will be described by showing Expression 2 and Expression 3.

$$Corr(T) = \left|\sum_t S(t) \times R^*(t)\right|^2 \quad \text{Expression 2}$$

$$= \left|\sum_t S(t) \times (R_0(t) + R_1(t) + R_2(t) + \ldots + R_n(t))^*\right|^2$$

$$R_n(t) = (R_i(t) + jR_q(t))e^{-j\omega_n t} \quad \text{Expression 3}$$

$$= (R_i(t) + jR_q(t))(\cos(\omega_n t) - j\sin(\omega_n t))$$

$$= (R_i(t) \cdot \cos(\omega_n t) + jR_q(t) \cdot \sin(\omega_n t)) +$$

$$j\{R_q(t) \cdot \cos(\omega_n t) - R_i(t) \cdot \sin(\omega_n t)\}$$

In the Expression 2, Rn(t) can be expanded to be expressed like the Expression 3.

From the Expression 2 and Expression 3, there is generated a corrected reference signal R(t) as a result of addition between a reference signal R0(t) and a reference signal R1(t)-Rn(t) with a deviated frequency, and a measurement signal S(t) is multiplied by the corrected reference signal R(t), obtaining a correlation-corrected correlation output. It thereby allowed to expand a correlative frequency range greater than conventional.

Figure 7:
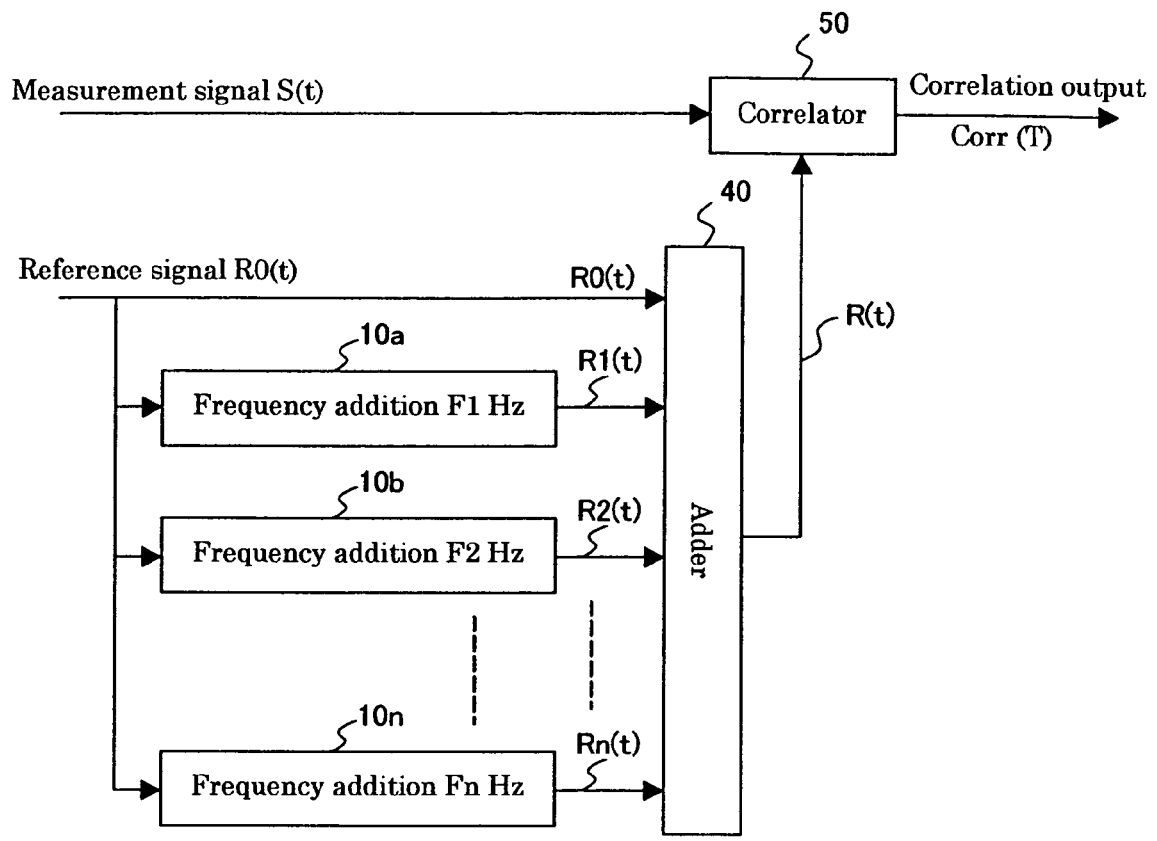
FIG. 7 is a block diagram showing a correlation value calculation apparatus 1 according to a fourth embodiment of the present invention.

FIG. 7 is a conceptual block constitutional diagram associated with a correlation based on the Expression 2. Component elements associated with a correlation in FIG. 7 are implemented with a correlator 50, a plurality n of frequency addition parts 10*a*-10*n*, and an adder 40. This constitution is that having added the plurality n of frequency addition parts 10*a*-10*n* and the adder 40 relative to a conventional constitution. It should be noted that each element itself can be implemented as a hardware (matched filter, adder, etc.) or software, whichever. Note that detailed constitution is like the first embodiment, and details are omitted.

The frequency addition part 10*a* receives a reference signal R0(t) and performs thereto a multiplicative addition of a frequency F1 to have a resultant signal R1(t) to be supplied to the adder 40. Likewise, a reference signal R0(t)

is received, and signals R2(t)-Rn(t) having frequencies F2, F3, . . . , Fn multiplicatively added thereto are each respectively supplied, where the reference signal R0(t) is a reference signal R(t) having no frequency added. Note that like the first embodiment it is general to add a frequency to the reference signal R0(t) by the multiplication by a signal of a frequency function of $e^{-j\omega t}$.

The adder 40 receives the multiplicatively added signals R1(t)-Rn(t) and the reference signal R0(t) and adds them together to obtain a resultant corrected reference signal R(t) to be supplied to the correlator 50.

Figure 8:
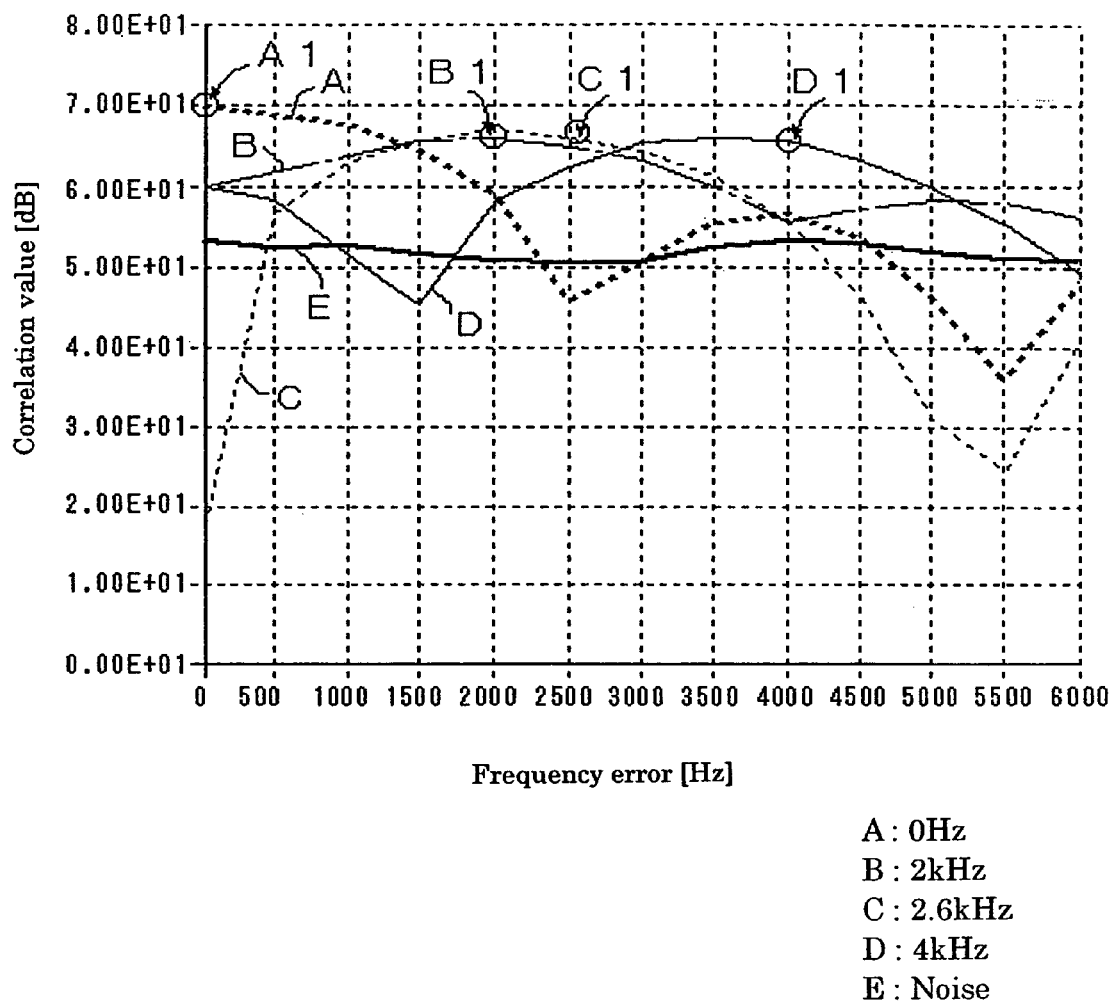
FIG. 8 is a diagram showing "frequency error" vs. "correlation value"

Next, there are shown in FIG. 8 correlation output characteristics each respectively of "frequency error" vs. "correlation value" for a frequency addition based on a correlation output signal Corr(T) output after a multiplication process at the correlator 50 receiving the measurement signal S(t) and the corrected reference signal R(t) in the arrangement of FIG. 7. Conditions therefor are as in the characteristic graph of which the data rate is 16 ksps (BPSK), the spread rate is by use of an orthogonal gold code of 4.096 Mcps (QPSK), the spread ratio is 256, and the correlation range is for 6 symbol data. As the frequencies to be added at the frequency addition parts 10a-10n under the above-noted conditions are the correlation output characteristics for 0 Hz, 2 kHz, 2.6 kHz, and 4 kHz to be added. As will be seen from FIG. 8, in the reference signal having a frequency added, the correlation value becomes maximum at the added frequency.

For example, for the frequency addition of 0 Hz shown by A in FIG. 8, the correlation value indicates a maximum at a position of A1 in FIG. 8, i.e., at a 0 Hz position. Likewise, for the frequency addition of 2 kHz shown by B in FIG. 8, the correlation value indicates a maximum at a position of B1 in FIG. 8, i.e., at a 2 kHz position, for the frequency addition of 2.6 kHz shown by C in FIG. 8, the correlation value indicates a maximum at a position of C1 in FIG. 8, i.e., at a 2.6 kHz position, and for the frequency addition of 4 kHz shown by D in FIG. 8, the correlation value indicates a maximum at a position of D1 in FIG. 8, i.e., at a 4 kHz position.

From the foregoing description, by addition of reference signals R0(t), R1(t), . . . , and Rn(t) having their frequency characteristics, the correlation value will not suddenly decrease even when the frequency error is large, with a great advantage that a correlation can be easily taken with a known data even in a case of a relatively large frequency error.

Fifth Embodiment

Figure 9:
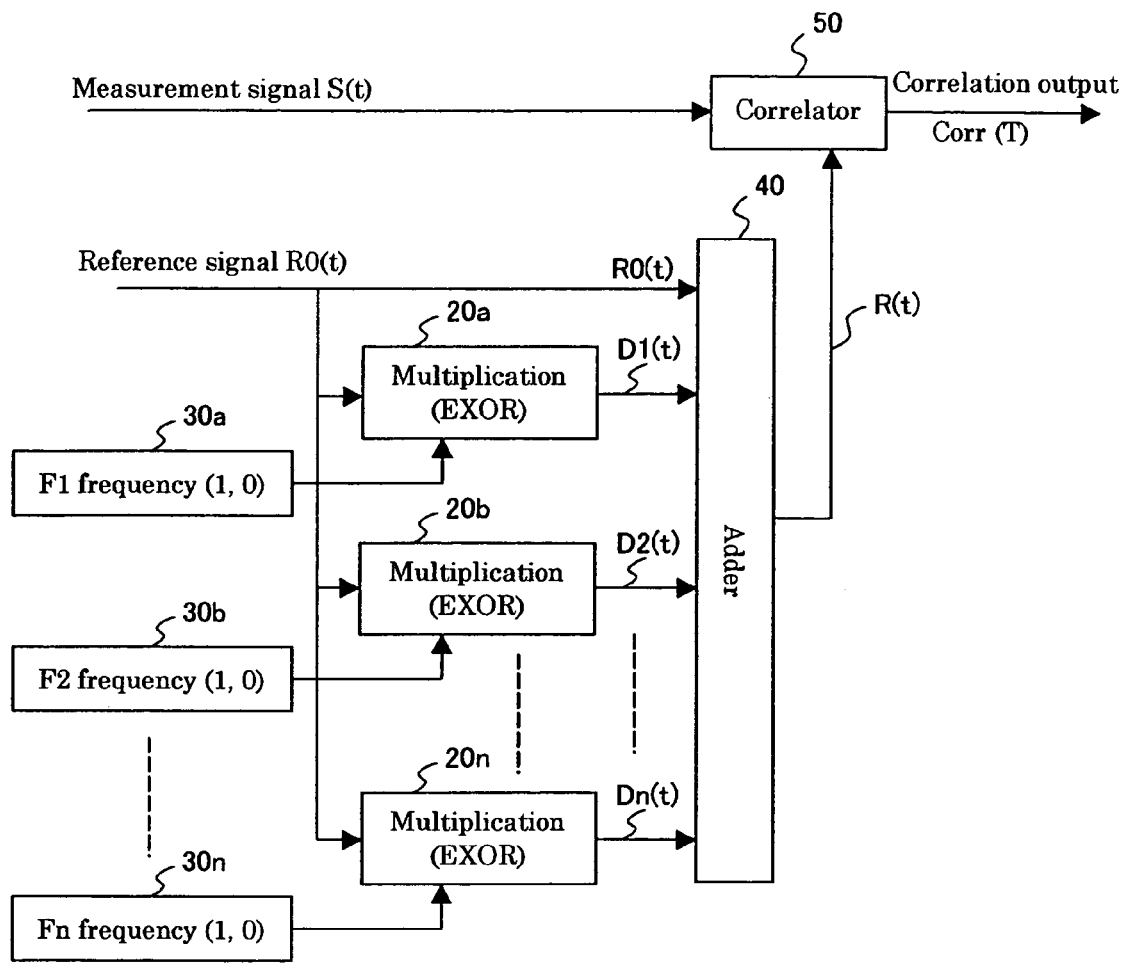
FIG. 9 is a block diagram showing a correlation value calculation apparatus 1 according to a fifth embodiment of the present invention.

Next, description will be made of a conceptual block constitutional diagram of FIG. 9. FIG. 9 is a conceptual block diagram in which a reference signal R0(t) is multiplied by a frequency. Like parts to the fourth embodiment are designated by like reference characters without description.

As noted in the fourth embodiment, the basic principle is a method of multiplying the reference signal R0(t) by a signal of frequency function of $e^{-j\omega t}$, while it may be implemented by a digital clock multiplication system also, as another method for easy addition of frequency. The constitution in FIG. 9 is an example of multiplication of the reference signal R0(t) by the frequency of a digital clock, and for arrangement in circuit, there is used an EXOR (exclusive logical sum). In a numerical notation, this is to multiply by −1,1(1,0).

Frequency addition parts 30a, b, . . . , and n generate digital clocks of frequencies F1, F2, . . . , and Fn, respectively. Multiplication parts 20a, b, . . . , and n each take an EXOR between the reference signal R0(t) and one of outputs of the frequency addition parts 30a, b, . . . , and n. An adder 40 outputs a total sum of outputs D1(t), D2(t), . . . , and Dn(t) of the multiplication parts 20a, b, . . . , and n and the reference signal R0(t). The total sum is defined as a reference signal R(t). A correlator 50 takes a correlation between a measurement signal S(t) and the reference signal R(t) to output a correlation output Corr(T).

Next, there will be described actions. First, the frequency addition parts 30a, b, . . . , and n generate digital docks of the frequencies F1, F2, . . . , and Fn, respectively. Next, to the multiplication parts 20a, b, . . . , and n are input the reference signal R0(t) and outputs of the frequency addition parts 30a, b, . . . , and n. Then, the multiplication parts 20a, b, . . . , and n each output an EXOR of inputs thereto. These outputs are D1(t), D2(t), . . . , and Dn(t). To the adder 40 are input the D1(t), D2(t), . . . , and Dn(t) and the reference signal R0(t), and the reference signal R(t) as a total sum is output. To the correlator 50 are input the reference signal R(t) and the measurement signal S(t), and the reference output Corr(T) as their correlation is output.

Sixth Embodiment

Figure 10:
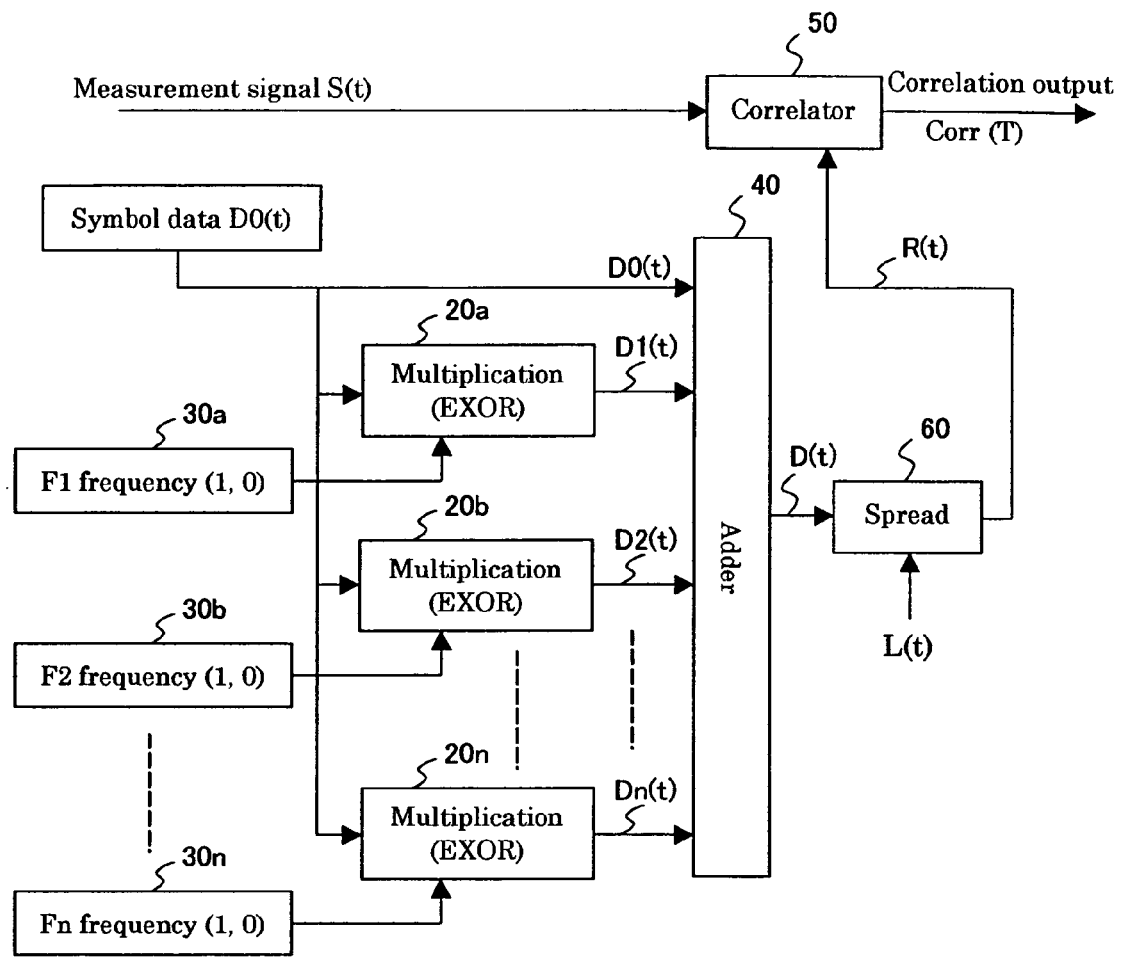
FIG. 10 is a block diagram showing a correlation value calculation apparatus 1 according to a sixth embodiment of the present invention.

Next, description will be made of a conceptual block constitutional diagram of FIG. 10. FIG. 10 is a conceptual block diagram in which a symbol data D(0) is multiplied by a frequency. Like parts to the fourth embodiment are designated by like reference characters without description.

As noted in the fourth embodiment, the basic principle is a method of multiplying a reference signal R0(t) by a signal of frequency function of $e^{-j\omega t}$, while it may be implemented by a digital clock multiplication system also, as another method for easy addition of frequency. In FIG. 10, by provision of a spreader 60, an EXOR-ed input signal is received for superposition of a spread signal to output a corrected reference signal R(t) analogous to FIG. 7. With this arrangement, there is enabled a correlation correction by multiplying the symbol data D(0) of digital data by a clock frequency of 1, 0.

Frequency addition parts 30a, b, . . . , and n generate digital clocks of frequencies F1, F2, . . . , and Fn, respectively. Multiplication parts 20a, b, . . . , and n each take an EXOR between the symbol data D0(t) and one of outputs of the frequency addition parts 30a, b, . . . , and n. An adder 40 outputs a total sum of outputs D1(t), D2(t), . . . , and Dn(t) of the multiplication parts 20a, b, . . . , and n and the symbol data D0(t). The total sum is defined as a D(t). The spreader 60 superposes a spread signal L(t) on the D(t) to output a reference signal R(t). A correlator 50 takes a correlation between a measurement signal S(t) and the reference signal R(t) to output a correlation output Corr(T). A symbol data generator 70 generates the symbol data D0(t).

Next, there will be described actions. First, the frequency addition parts 30a, b, . . . , and n generate digital clocks of the frequencies F1, F2, . . . , and Fn, respectively. Next, to the multiplication parts 20a, b, . . . , and n are input the symbol data D0(t) and outputs of the frequency addition parts 30a, b, . . . , and n. Then, the multiplication parts 20a, b, . . . , and n each output an EXOR of inputs thereto. These outputs are D1(t), D2(t), . . . , and Dn(t). To the adder 40 are input the D1(t), D2(t), . . . , and Dn(t) and the symbol data D0(t), and a total sum D(t) is output. The spreader 60 superposes the spread signal L(t) on the D(t) to output the reference signal R(t). To the correlator 50 are input the reference signal R(t) and the measurement signal S(t), and the reference output Corr(T) as their correlation is output.

Figure 11:
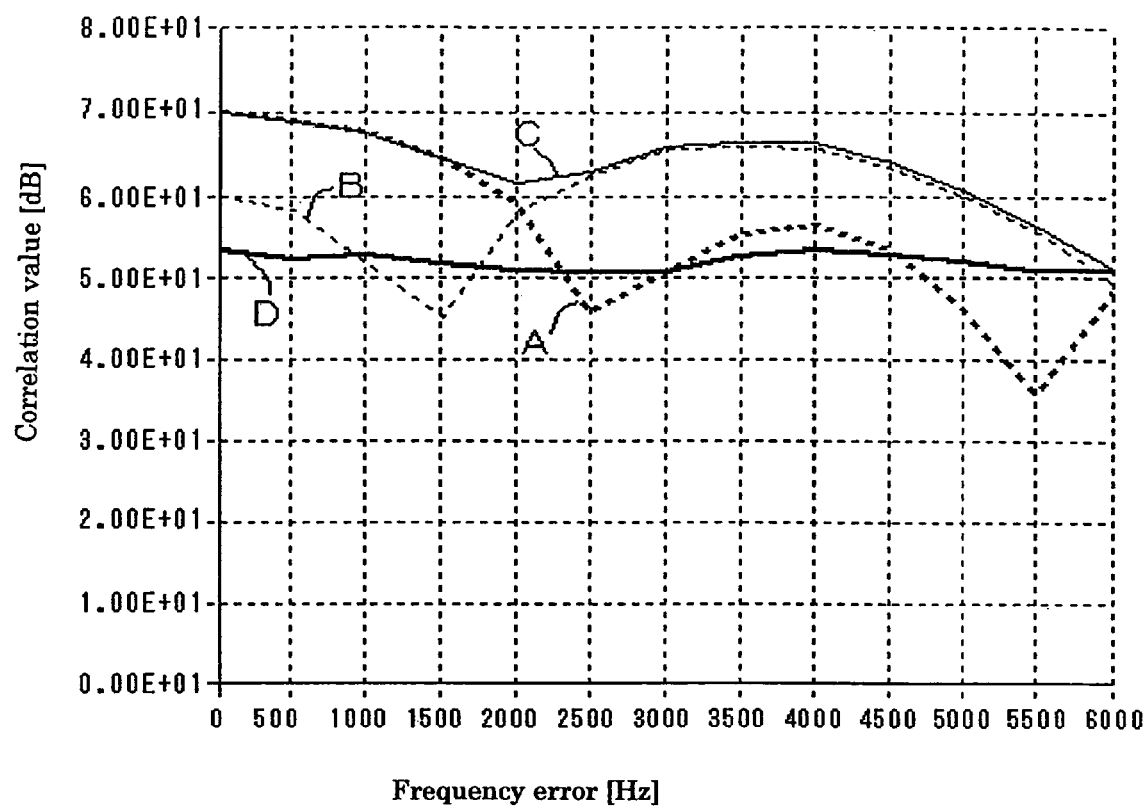
FIG. 11 is a diagram showing results of a simulation of "frequency error" vs. "correlation value"
Figure 12:
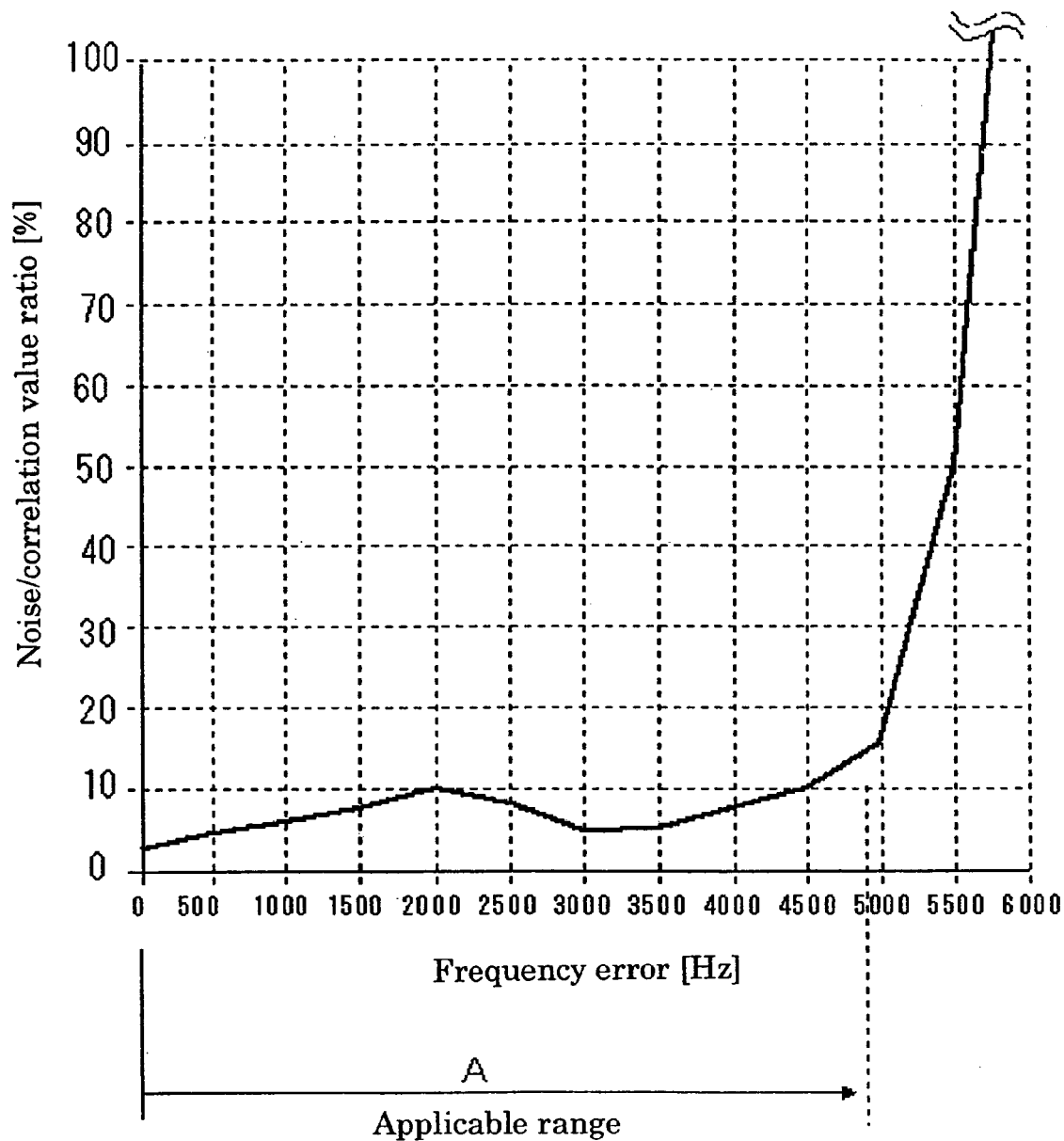
FIG. 12 is a diagram showing results of a simulation of "frequency error" vs. "ratio of a noise by correlation error to an added value of correlation value"
Figure 13:
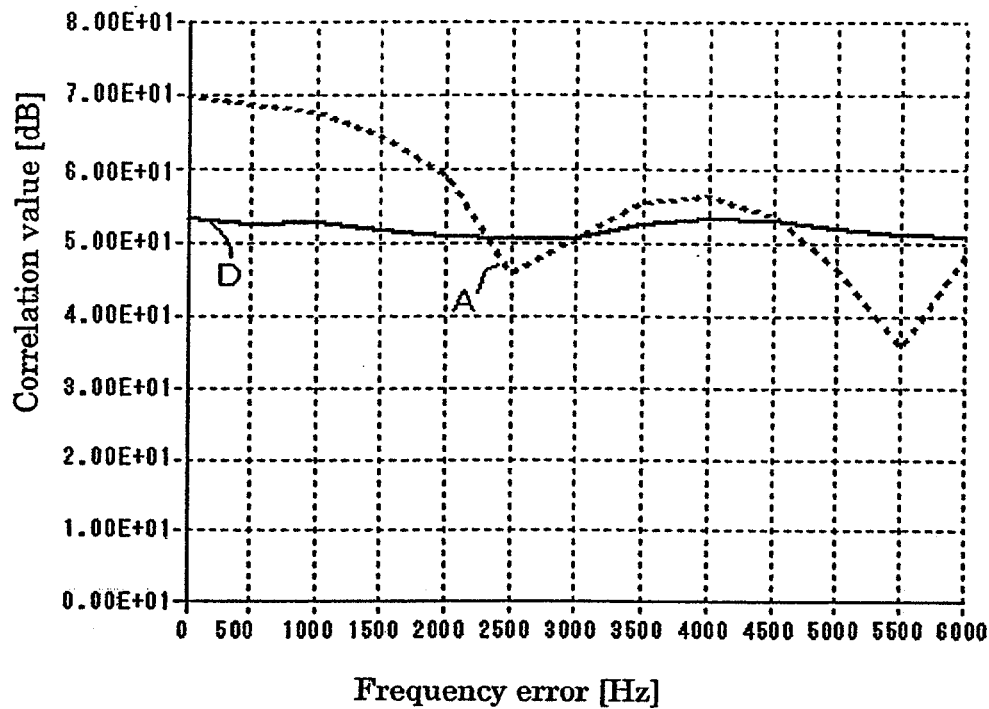
FIG. 13 is a diagram showing a characteristic of "frequency error" vs. "correlation value" in a conventional art.
Figure 14:
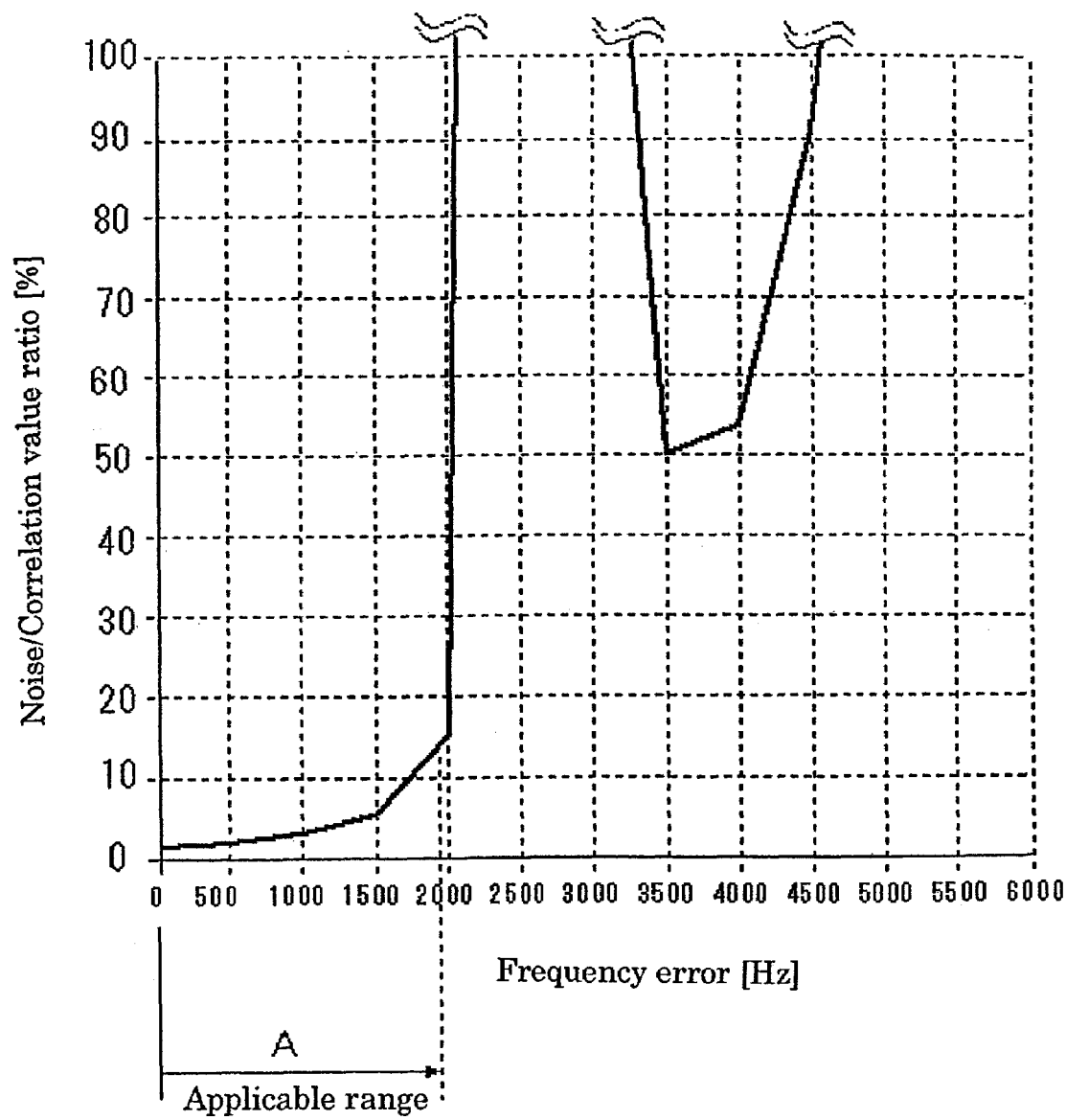
FIG. 14 is a diagram showing a characteristic of "frequency error" vs. "noise/correlation value ratio" in a conventional art.

Next, there will be described characteristic graphs of FIG. 11 and FIG. 12 as simulation results of the fifth and sixth embodiments. FIG. 11 is a simulation result showing, relative to a "frequency error", a "result of correlation value greatly improved by addition of a correlation value with a reference wave and a correlation value with a 4 kHz added reference wave", and FIG. 12 is a simulation result showing a "frequency error" vs. a "ratio of an added value of noise vs. correlation by correlation error". Conditions therefor also are as in the characteristic graph of which the data rate is 16 ksps (BPSK), the spread rate is by use of an orthogonal gold code of 4.096 Mcps (QPSK), the spread ratio is 256, and the correlation range is for 6 symbol data, and the method of frequency addition is by digitally adding one frequency (4 kHz: 11-1-111) to a symbol data, with a multiplexity of 4 data multiplex.

It is seen from FIG. 11 that a correlation value (see A in FIG. 11) with the reference signal (R0(t)) has 0 Hz as a maximum value and, as the frequency error increases, the correlation value decreases. On the other hand, it is seen that a correlation value (see B in FIG. 11) with the 4 kHz added reference signal (Rn(t)) has 4 kHz as a maximum value and, as the frequency error deviates from 4 kHz, the correlation value decreases. Of a correlation value (see C in FIG. 11) having the two reference values added, the correlation value can be held large up to approximate 5 kHz or near.

FIG. 12 shows, relative to a frequency error, a ratio of noise by a correlation error to a frequency added correlation value. It can be seen therefrom that, as shown in FIG. 12, an extent up to approximate 4.5 kHz or near falls within an applicable range where a correlation can be taken with a noise power of 10%. On the other hand, although a correlation can be taken merely up to 2 kHz or near by only the reference signal (R0(t)) shown at A in FIG. 5, it is allowed, as a result of an improvement achieved up to 4.5 kHz or near by a correlation correction for addition to a 4 kHz added reference signal (Rn(t)) according to the present invention, to take a correlation even in presence of a frequency error, as a great advantage.

It should be noted that the technical concept of the present invention is not limited to concrete constitutional examples of the foregoing embodiments. Further, the foregoing embodiments may be modified to be applied for execution, as desirable.

According to the present invention, a noise/correlation value ratio is kept from increasing, even when a frequency error is large. Accordingly, a correlation can be taken even with an increased frequency error.

What is claims is:

1. A correlation system comprising:
   a frequency adding means for receiving a reference signal R0(t) and adding thereto a predetermined plurality n of frequency components (F1-Fn) to output a resultant reference signal R1(t)-Rn(t), wherein n and t are integers;
   an adder for receiving n reference signals R1(t)-Rn(t) and a single said reference signal R0(t) as a base and adding them together to output a corrected reference signal R(t); and
   a correlator for taking a correlation between a measurement signal S(t) and said corrected reference signal R(t) to output a correlation output signal.

2. A correlation system according to claim 1, wherein the frequency adding means multiplies the reference signal R0(t) by $e^{j\omega t}$, where $\omega=2\pi f$ (f is a frequency).

3. A correlation system according to claim 1 wherein the frequency adding means outputs an exclusive logical sum (EXOR) between digital clocks of frequencies corresponding to the frequency components (F1-Fn) and the reference signal R0(t).

4. A correlation system according to claim 1, wherein the measurement signal S(t) is a reception signal of a spread spectrum signal.

5. A correlation system according to claim 1, wherein the measurement signal S(t) is a spectrum spread signal of a W-CDMA system.

6. A correlation method comprising:
   receiving a reference signal R0(t) and adding thereto a predetermined plurality n of frequency components (F1-Fn) to output a resultant reference signal R1(t)-Rn(t), wherein n and t are integers;
   receiving n reference signals R1(t)-Rn(t) and a single said reference signal R0(t) as a base and adding them together to output a corrected reference signal R(t); and
   taking a correlation between a measurement signal S(t) and said corrected reference signal R(t) to output a correlation output signal.

7. A correlation system comprising:
   a frequency adding device that receives a reference signal R0(t) and adds thereto a predetermined plurality n of frequency components (F1-Fn) to output a resultant reference signal R1(t)-Rn(t), wherein n and t are integers;
   an adder that receives n reference signals R1(t)-Rn(t) and a single said reference signal R0(t) as a base and adds them together to output a corrected reference signal R(t); and
   a correlator that takes a correlation between a measurement signal S(t) and said corrected reference signal R(t) to output a correlation output signal.

* * * * *